US008141063B2

(12) United States Patent
Foley

(10) Patent No.: US 8,141,063 B2
(45) Date of Patent: Mar. 20, 2012

(54) STATIC ANALYSIS OF REACHABLE METHODS AND FIELDS IN OBJECT-ORIENTED APPLICATIONS USING OBJECT INSTANTIATION

(75) Inventor: Sean C. Foley, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1237 days.

(21) Appl. No.: 11/847,677

(22) Filed: Aug. 30, 2007

(65) Prior Publication Data
US 2009/0064099 A1 Mar. 5, 2009

(51) Int. Cl.
G06F 9/45 (2006.01)
(52) U.S. Cl. .......................... 717/154; 717/152; 717/159
(58) Field of Classification Search .................. None
See application file for complete search history.

(56) References Cited

U.S. PATENT DOCUMENTS

| | | | | |
|---|---|---|---|---|
| 5,983,020 | A * | 11/1999 | Sweeney et al. | 717/141 |
| 6,041,179 | A * | 3/2000 | Bacon et al. | 717/116 |
| 6,179,491 | B1 * | 1/2001 | Choi et al. | 717/116 |
| 6,230,314 | B1 * | 5/2001 | Sweeney et al. | 717/108 |
| 6,279,149 | B1 * | 8/2001 | Field et al. | 717/129 |
| 6,301,700 | B1 * | 10/2001 | Choi et al. | 717/116 |
| 6,463,581 | B1 * | 10/2002 | Bacon et al. | 717/154 |
| 6,546,551 | B1 * | 4/2003 | Sweeney et al. | 717/154 |
| 6,654,951 | B1 * | 11/2003 | Bacon et al. | 717/154 |
| 6,925,638 | B1 * | 8/2005 | Koved et al. | 717/155 |
| 7,003,507 | B2 * | 2/2006 | Tip et al. | 1/1 |
| 7,669,193 | B1 * | 2/2010 | Chipman | 717/152 |
| 7,685,586 | B1 * | 3/2010 | Foley | 717/154 |
| 2003/0018603 | A1 * | 1/2003 | Tip et al. | 707/1 |
| 2005/0071810 | A1 * | 3/2005 | Sutter et al. | 717/116 |
| 2005/0289531 | A1 | 12/2005 | Illowsky et al. | |
| 2006/0080644 | A1 * | 4/2006 | Fuhrer et al. | 717/137 |

OTHER PUBLICATIONS

Sweeney et al., Extracting Library-Based Object-Oriented Applications, published by ACM, 2000, pp. 98-107.*
Tip et al., Extracting Library-Based Java Application—Reducing the size of Java application by creating an application extractor, published by Communication of the ACM, Aug. 2003, vol. 46, No. 8, pp. 35-40.*
Sean Foley, From Gobal to Local Escape Analysis in Java—Combing Interprecedural Analysis with Instantiated Objects and Intraprocedural Analysis with Stack Maps, SIGPLAN' 05, Jun. 12-15, 2005, pp. 1-18.*
Practical Extraction Techniques for Java, Tip et al., Sep. 19, 2001, RC22178 (W0109-033), Computer Science.
Combined Static and Dynamic Analysis, Artho et al., pp. 1-20.

(Continued)

Primary Examiner — Tuan Dam
Assistant Examiner — Zheng Wei
(74) Attorney, Agent, or Firm — Cantor Colburn LLP; Libby Toub

(57) ABSTRACT

Exemplary embodiments of the present invention comprise an algorithm described herein that utilizes a technique to shrink a set of potentially reachable elements to a close approximation of the actually reachable elements within a software application by closely approximating how the application executes at runtime. The algorithm attempts to identify all of the reachable elements of an object-oriented software application by starting with the entry points into the application and thereafter progressively determining all of the software elements within the application that are reachable. The algorithm instantiates application objects in the same way they would be instantiated at runtime and passes references to these objects from one method and field to the next; emulating as closely as possible object instantiation performed by the application at runtime.

3 Claims, 3 Drawing Sheets

OTHER PUBLICATIONS

Space Optimization, [online]. [retrieved on Apr. 21, 2006]; retrieved from the Internet http://72.14.203.104/search?q=chche:SCDrYE7N6-QJ:w...od%22+%22object+oriented%22&hl=en&gl=in&ct=clnk&cd.

* cited by examiner

```
class C1 {
  C2 F1;
  static int F2, F3;

C1() {}

C2 M1() {
    C2 local1 = C2.F6;
    int local2 = F3;
    if(local2 <= 0) {
      F3 = local2 + F2 + 1;
      local1.M4(this, null);
    }
    C2.M5();
    return local1;
  } static C4 M2() {
    F2 -= F3;
    return new C4();
  }
} class C2 {
  char F4;
  C1 F5;
  static C2 F6;

C2() {
    new C1().M1();
    F6 = this;
  } void M3() { F4 = 'a'; }

C4 M4(C1 arg1, C4 arg2) {
    arg1.F1 = this;
```

Continued

```
    arg1.M1();
    return arg2 == null ? null : arg2.M6();
  } static void M5() {
    new C3(new C1());
    new C2().F4 = 3;
  }
} class C3 extends C1 {
  C1 F7;

C3(C1 arg) {
    C2 local;
    local = F1 != null ? F1 : arg.F1;
    if(local != null) {
      local.M3();
      F7 = this;
    }
    else F7 = arg;
  }

C2 M1() { return null; }
} class C4 {
  int F8;

C4() {}

C4 M6() {
    C4 local = new C4();
    local.F8 = F8 + 1;
    return local;
  }
}
```

FIG. 3

STATIC ANALYSIS OF REACHABLE METHODS AND FIELDS IN OBJECT-ORIENTED APPLICATIONS USING OBJECT INSTANTIATION

BACKGROUND OF THE INVENTION

1. Field of the Invention

This invention relates to the static analysis of object-oriented applications and particularly to the static analysis of reachable methods and fields within object-oriented applications by the use of object instantiation.

2. Description of Background

A compiled application consists of classes that hold fields (i.e., data members) and methods (i.e., functional members), all of which together are required to run the application.

In any given use of an application, only a subset of such elements might be utilized during the execution of the application. For example, a user of a word-processor application may make no use of spell-check software that forms a segment of the word processor application. In fact, the word processor may contain software that is inaccessible to the user regardless of the users' actions, this being a consequence of the inefficiency of the development process and the complexity of the software application.

In any software application there may be elements of the application that cannot be used because they are entirely unreachable regardless of how the software is utilized. Further, it is not a trivial exercise to determine which elements are reachable. Due to the fact that with any given analysis of the application all of the possible uses of the software must be considered simultaneously along with all possible inputs to the application, in addition to there being a potentially infinite number of inputs to a given application and an infinite number of uses of the application as well.

SUMMARY OF THE INVENTION

The shortcomings of the prior art are overcome and additional advantages are provided through the provision of a methodology for the identification of reachable elements within an object-oriented application using static analysis comprising creating a representation of each class type that is comprised within an object oriented application, creating a representation of each method and field that is associated with a respective class type, wherein the method and fields comprise static and non-static methods and fields, identifying entry points methods that are comprised within an object-oriented application, and invoking the entry point methods comprised within the object-oriented application.

The methodology further comprises creating representations of each object that is created within code of a method that has been determined to be reachable; wherein each representation of an object contains a representation of each non-static field that is associated with a respective class type, whereas object representations that represent array objects are represented as having a single field of class type matching the type of the array. The methodology maintains a record of static fields, static methods, and non-static methods within class representations that have been reached and non-static fields within the object representations that have been reached. The methodology maintains a list of object representations within each reachable static method and non-static method, each reachable static field that resides within each class representation, and each non-static field that resides within each object representation, wherein the object representations that have been passed to the method and field representations are added to their lists.

The methodology yet further comprises determining within each reachable method the additional field and method representations that are reachable by analyzing the methods and fields accessed by the code of the method, wherein non-static fields and methods are reachable only when both accessed by the code and additionally, an instance of a class type that declares a method or field is present within the list of object representations that is owned by the method being analyzed. Further, static methods and fields are reachable when accessed by the code. She methodology passes objects from methods to their reachable fields, from fields to their reachable methods, and from methods to their reachable methods, wherein objects are passed as determined by instructions within the code of the methods.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates one example of the source code of an object-oriented program depicted in FIGS. 1 and 2.

Figure 1:
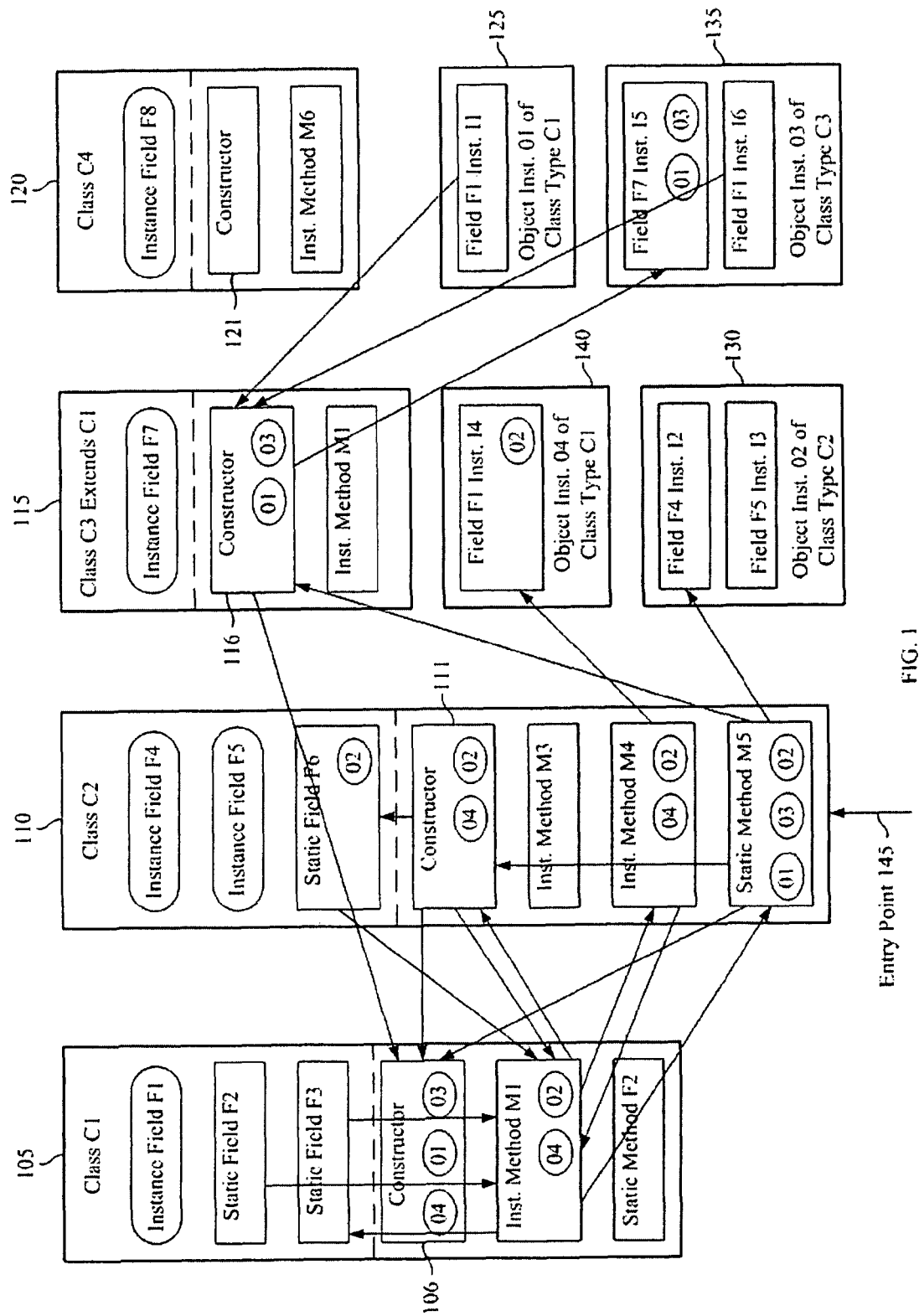
FIG. 1 illustrates one example of a block diagram detailing a methodology for determining the reachable elements of an object-oriented application in accordance with exemplary embodiments of the present invention.

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Within exemplary embodiments of the present invention the algorithm described herein utilizes a technique to shrink a set of potentially reachable elements to a close approximation of the actually reachable elements within a software application by closely approximating how the application executes at runtime. The algorithm attempts to identify all of the reachable elements of an object-oriented software application by starting with the entry points into the application and thereafter progressively determining all of the software elements within the application that are reachable. The algorithm instantiates application objects in the same way they would be instantiated at runtime and passes references to these objects from one method and field to the next; emulating as closely as possible object instantiation performed by the application at runtime.

At runtime, in order to access non-static methods and fields of a particular class type an object of a requisite type must be available to a given method invocation. The present algorithm provides an accurate rendition/depiction of which objects types are available within a given method whenever it is invoked at runtime, therefore giving a more accurate picture of which methods and fields are accessible from that method. This is advantageous because it produces a more complete listing of the unreachable elements of an object oriented software application and therefore provides reduced size and increased efficiency. Such improvements increase in importance on devices with constraints on memory and processing speed, but they can also be instrumental in reducing the size of very large applications on any platform.

Within exemplary embodiments of the present invention a class type may contain a set of fields (which are members of the class which hold data) as well as methods (the members of a class which run machine instructions). Each class type represents a class of objects that may exist, wherein each object has its own set of data fields and methods. Further, the members of a class declared static pertain to all objects of the given class type. The present algorithm creates a representation of every class, method, and field comprised within an application. As the algorithm progresses it creates representations of every created object of a given class type, each of which hold representations of each field declared by the class type that is not static.

As part of the analysis of an application, each class representation can be marked as required. Each method representation (static and non-static) can be marked as invoked and can hold within themselves a list of any number of contained object representations. Each static field representation may be marked as required and can hold within themselves a list of any number of object representations that are instances of classes that match the field's declared class data type. There can be only one representation of each class, method and static field. However, many object representations of a given class type can be created, but there may be at most one object representation for a given instruction within the code of a method. Further, each object representation has a representation of each non-static field that is defined by the class of the object, each of which can be marked as required and can hold within themselves a list of any number of object representations that are instances of classes that match the field's declared class data type.

The algorithm progresses in iterations, with each iteration of the algorithm each method and field are checked to see if they can pass objects to other method and fields, and/or mark methods as required or invoked, and/or mark fields as required, and/or mark classes as required. The initial iteration begins with the entry points. If a method entry point is not static then an associated object representation of the method's declaring class type must be created and this object must be passed to the method representation.

With each iteration the algorithm checks every method and field, the methods and static fields contained within class representations and the non-static fields contained within object representations. If any such method has been invoked but its code has not been analyzed to determine additional reachable methods and fields, or it contains objects that it has not previously passed to methods and fields reachable from itself, or it contains an object that can be passed to an item it has not been passed before, then it is allowed to do so but at the same time heeding the restrictions imposed by the class types associated with the receiving methods and fields. If any field or field instance contains objects that it has not passed along before or it contains an object that can be passed to a method to which it has not been passed before, then it is allowed to do so but at the same time heeding the restrictions imposed by the receiving methods and fields.

The first restriction regarding the passing of object representations is presented by the declaring class type of a non-static method or non-static field. Such a non-static field or non-static method is only reachable from a method which has previously received an object representation whose type matches or is a subtype of the aforementioned declaring class type. Special care must be given to virtual method invocation. The method call in the method may refer to a given declared method in a class, yet if the class type of the object passed contains an overriding method, then the targeted method is marked as required while the overriding method is the invoked method. In the case of an exception object which has been received as the result of a throw operation from an invoked method, the object is only available to match the declaring class of a non-static field or non-static method if the method which holds that exception object also contains an exception handler for that object's class type.

Additional restrictions govern the passing of object representations. An object will be passed to a field only when the object is an instance of a field's type. An object and will be passed to an invoked method only when a object is an instance of a method's parameter type or if the method is non-static and the object is an instance of the type declaring the method; an object will be passed from a method back to an invoking method only when the object is an instance of a method's return type or when the object can be thrown as an exception object, or when the object has been thrown by an invoked method. When an object representation has been received by a method or a field, it is contained within that receiver's list of contained object representations, and becomes eligible to be passed on to any further method or field that becomes reachable from the receiver of the object, with the exception of a thrown object, which can be passed as a thrown object to any invoking method, but otherwise cannot be passed elsewhere unless the method has a matching exception handler.

The algorithm is guaranteed to reach completion: There are a finite number of static fields, a finite number of methods and therefore also a finite number of possibly created objects and field instances—each method is restricted to creating only a single object representation of each class. Since each created object need not be passed from one item to another more than once the algorithm will complete after a finite number of iterations.

FIG. 1 is an illustration of the invention at work on the code written in the Java™ programming language in FIG. 3. As shown in FIG. 1 representations of the respective class object types (105, 110, 115, 120) that are comprised within an application wherein each object has its own set of data fields, methods, and constructors (106, 111, 116, 121). Further, a class representation of the Class Object Types (125, 130, 135, 140) will have been instantiated along with their respective fields that are associated with each Class Type (105, 110, 115, 120) for an improved analysis of where references to those types are available, making for an improved analysis of which elements are reachable. The entry point 145 for the application is determined and the sole program interface element is determined to be the static method M5 of the Class Type C2 (110). The static method M5 is invoked via the entry point 145.

The static method M5 creates three new objects, objects O1, O2 and O3, whose constructors (106, 111, 116) are invoked with their respective objects being passed along to the constructors 106, 111, 116. The constructor of Class Type C3 (115) takes an argument of Class Type C1 (105), thus object O1 is also passed to the constructor of Class Type C1 (105). Because Class Type C3 (115) is a subclass of Class Type C1 (105) Object O3 holds instance fields for both Class Types C1. (105) and Class Type C3 (115), which are I5 and I6 respectively. Static Method M5 writes to Field F4 Instance I2 of Object Instance 02 (130). Since Static Method M5 holds an Object O2 of Class Type C2 it writes to Field F4 Instance I2 of Object O2.

The constructor (111) of Class Type C2 (110) creates Object O4 of Class Type C1 (105) and passes this object to the constructor (106) of Class Type C1 (105). The constructor 106 has a call to Instance Method M1 of Class Type C1 (105), and since it holds an Object O4 of Class Type C1 it invokes Instance Method M1 and passes O4 to the Instance Method M1. Because Instance Method M1 returns an object of Class Type C2 (110), the constructor (111) of Class Type C2 (110) can also receive such objects from Instance Method M1. The constructor (111) of Class Type C2 (110) writes to Static Field F6 and because Static Field F6 can hold objects of Class Type C2 the constructor (111) passes Object O2 to Static Field F6.

The constructor (116) of Class Type C3 invokes the constructor (106) of its super-class Class Type C1 (105) and passes O3 to this constructor (106). Because the constructor 116 holds another Object O1 of Class Type C1 (105) this object is also passed to the constructor 106 of Class Type C1 (105). The constructor (116) of Class Type C3 (115) has a write instruction to Instance Field F7 of Class Type C3 (115), and because of this, since it holds an instance of O1 of Class Type C3 (115) it can write to this object's (135) Field F7 Instance Field I5. The constructor 116 of Class Type C3 holds Objects O1 and O3 both of Class Type C1, which is the type of Instance Field F7; therefore it passes both of these objects to Field F7 Instance Field I5.

The constructor 116 of Class Type C3 (115) has a read instruction to Instance Field F1 of Class Type C1 (105), and since it holds Object O1 of Class Type C1 (105) it can read from Field F1 Instance Field I1 (125). Since Object O3 is also of Class Type C1 (105) the constructor 116 of Class Type C3 115 can read from Field F1 Instance Field I6 as well. The constructor 106 of Class Type C1 (105) was invoked for the first time in the previous iteration, but this constructor performs no operations.

Instance Method M1 was invoked for the first time in the previous iteration. Instance Method M1 reads from Instance Fields F2 and F3 and writes to Instance Field F3. Further, Instance Method M1 reads from Instance Field F6 and invokes Static Method M5. Since Instance Method M1 reads Instance Field F6 and since F6 holds Object O2, this object is passed to Instance Method M1. Instance Method M1 receives Object O2 of Class Type C2 110; because Instance Method M1 returns objects of Class Type C2 110, it can pass Object O2 to the constructor 111 of Class Type C2 that previously invoked Instance Method M1, but this constructor 111 already holds Object O2 instance Method M1 has a call to Instance Method M4 of Class Type C, and since it holds an Object O2 of Class Type C it invokes Instance Method M4 and passes Object O2 to Instance Method M4. Instance Method M4 takes arguments of Class Type C1 (105) so it passes Object O4 of Class Type C to instance Method M4.

Instance Method M4 was invoked in the previous iteration for the first time and Objects O2 and O4 were passed to Instance Method M4. Instance Method M4 writes to Instance Field F1 of Class Type C. Since Object O4 is of Class Type C, Instance Method M4 can write to Field F1 Instance Field I4 of object O4 (140). Field F1 holds objects of Class Type C2 (110), and since object O2 is of Class Type C, it passes Object O2 to Field F1 Instance I4. Instance Method M4 has a call to Instance Method M1 of Class Type C1 (105), and since Instance Method M4 holds Object O4 of Class Type C1 (105) it invokes Instance Method M1. Instance Method M4 can pass Object O4 to Instance Method M1 but Instance Method M1 already holds Object O4. Instance Method M1 returns objects of Class Type C2 (110) and thus can pass the Object O2 of Class Type C2 (110) to Instance Method M4, but Instance Method M4 already holds Object O2. Instance Method M4 returns objects of Class Type C4 (120) and thus can pass such objects to Instance Method M1. Instance Field I4 was given Object O2 previously, but it can pass this object nowhere. No other objects were passed and no method was invoked for the first time, so the iterations are complete.

Figure 2:
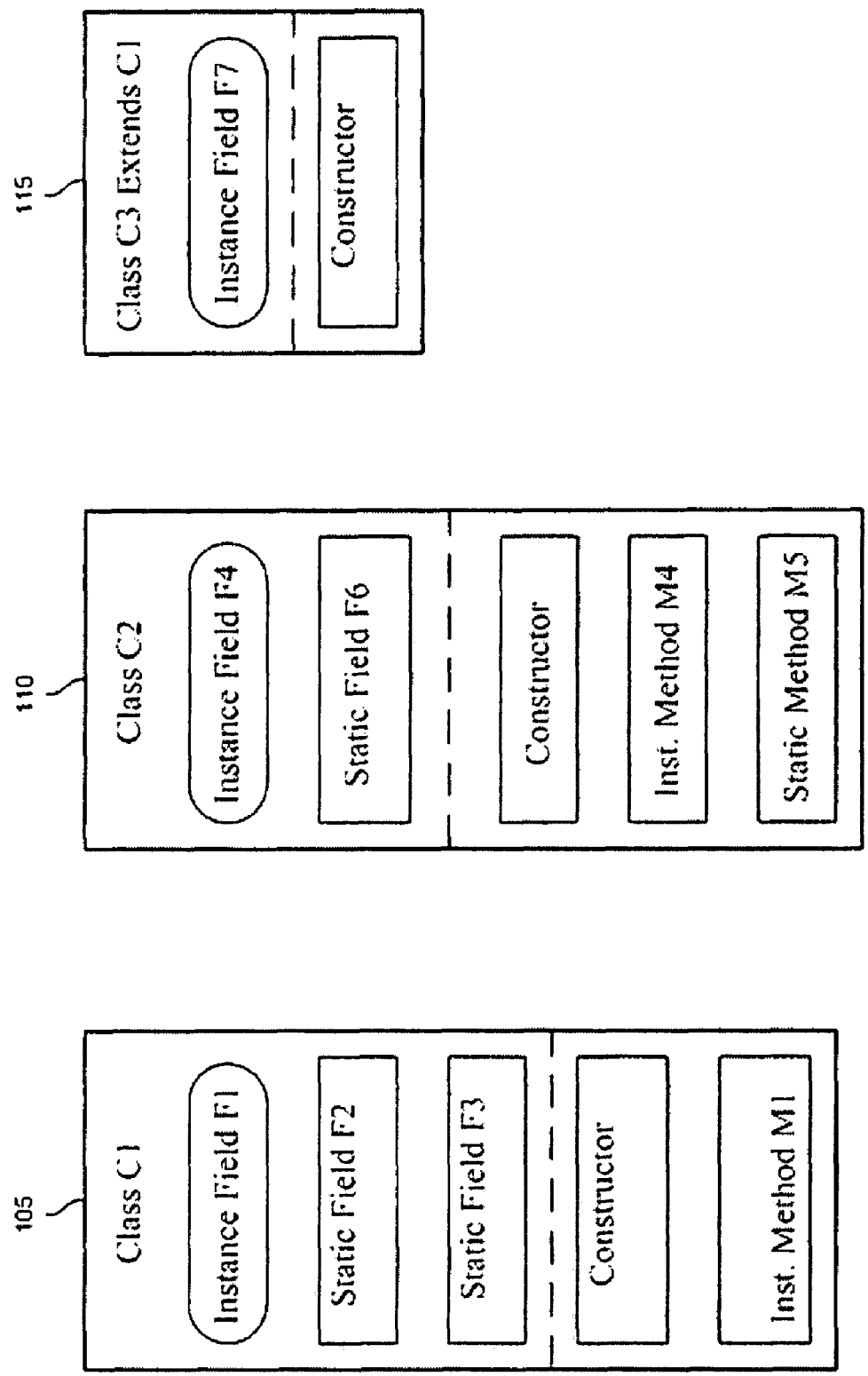
FIG. 2 illustrates one example of the resultant of the static analysis of an object-oriented application in accordance with exemplary embodiments of the present invention.

As shown in FIG. 2, upon the completion of the analysis it can be ascertained that Instance Method M2 was never invoked so it can be removed. Also, no instance of Instance Field F5 was accessed so it can be removed. Instance Method M3 was never invoked so it also can be removed. Further, Instance Method M1 in Class Type C3 was never invoked so it can be removed, although the method it overrides in Class Type C1 will remain. Class Type C4 was never accessed so it can be removed. Thus one class containing one method and one field has been removed, as well as three additional methods and one additional field. These unused items have been removed without any potential effect to the running program.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for die invention first described.

What is claimed is:

1. A method for the identification of reachable elements within an object-oriented application using static analysis, the method comprising:
creating a representation of each class type that is comprised within an object oriented application;
creating a representation of each method and field that is associated with a respective class type, wherein the method and fields comprise static and non-static methods and fields;
invoking entry point of the method and field comprised within the object-oriented application;

creating representations of each object that is created within code of a method that has been determined to be reachable, restricted to a single object per instantiation instruction within the method, or the number of created objects restricted by other means; wherein each representation of an object contains a representation of each non-static field that is associated with a respective class type, whereas object representations that represent array objects are represented as having a single field of class type matching the type of the array;

maintaining a record of static fields, static methods, and non-static methods within class representations that have been reached, and a record of non-static fields within object representations that have been reached;

maintaining a list of object representations within each reachable static method and non-static method, each reachable static field that resides within each class representation, and each non-static field that resides within each object representation, wherein the object representations that have been passed to the method and field representations are added to this list;

determining within each reachable method within class and object representations the additional field and method representations that are reachable by analyzing the methods and fields accessed by the code of the method, wherein non-static fields and methods are reachable only if accessed by the code and additionally, when an instance of a class type that declares that method or field is present within the list of object representations that is owned by the method being analyzed, and wherein static methods and fields are reachable if accessed by the code; and passing objects from methods to their reachable fields, from fields to their reachable methods, and from methods to their reachable methods, wherein objects are passed as determined by instructions within the code of the methods;

wherein an object can be passed to a field only when the object type is an instance of a field's type, an object can be passed to a method when the object type is an instance of a method's parameter type, an object can be passed to an invoked non-static method if the object type is an instance of the type declaring the method, and an object can be passed from a method back to an invoking method when an object type is an instance of a method's return type and the object can be thrown as an exception object.

2. The method of claim 1, further comprising removing from an application those classes, fields and methods that are determined as being unreachable.

3. The method of claim 1, further comprising optimizing an application based on the knowledge of those classes, fields and methods which are reachable.

* * * * *